United States Patent
Yokokura

(10) Patent No.: US 8,584,724 B2
(45) Date of Patent: Nov. 19, 2013

(54) PNEUMATIC TIRE

(75) Inventor: Hiroyuki Yokokura, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 922 days.

(21) Appl. No.: 12/515,677

(22) PCT Filed: Nov. 22, 2007

(86) PCT No.: PCT/JP2007/072630
§ 371 (c)(1),
(2), (4) Date: Jun. 9, 2009

(87) PCT Pub. No.: WO2008/062862
PCT Pub. Date: May 29, 2008

(65) Prior Publication Data
US 2010/0071826 A1    Mar. 25, 2010

(30) Foreign Application Priority Data
Nov. 24, 2006    (JP) .................. 2006-317367

(51) Int. Cl.
*B60C 9/18* (2006.01)

(52) U.S. Cl.
USPC ............ 152/526; 152/527; 152/536; 152/451

(58) Field of Classification Search
USPC .......... 152/526, 527, 537, 451, 536
See application file for complete search history.

(56) References Cited

U.S. PATENT DOCUMENTS 3,851,692 A * 12/1974 Takemura et al. ............ 152/527
4,887,655 A * 12/1989 Imai et al. ..................... 152/531
4,947,916 A   8/1990  Ishikawa et al.

FOREIGN PATENT DOCUMENTS

| JP | 62-085703 | * | 4/1987 |
|---|---|---|---|
| JP | 1-168505 A | | 7/1989 |
| JP | 1-240305 A | | 9/1989 |
| JP | 10-166812 A | | 6/1998 |
| JP | 11-139109 A | | 5/1999 |
| JP | 2001-080316 A | | 3/2001 |
| JP | 2002-059706 A | | 2/2002 |
| JP | 2004-224074 A | | 8/2004 |
| WO | 02/07994 A1 | | 1/2002 |
| WO | 2006/077978 A1 | | 7/2006 |

OTHER PUBLICATIONS

English machine translation of Yamashita (JP10-16812), dated Jun. 1998.*

* cited by examiner

*Primary Examiner* — Justin Fischer
*Assistant Examiner* — Robert Dye
(74) *Attorney, Agent, or Firm* — Sughrue Mion, PLLC

(57) ABSTRACT

A pneumatic tire having a reduced weight and improved durability is provided.
In this pneumatic tire, at least one of the carcass ply and belt plies or the belt-reinforcement layer is constituted of reinforcing cords being para-aramid cords, and the para-aramid cords satisfy the relationship represented by the following formulae (I) to (III):

$$E \leq 32.14 \times T - 236 \quad (I)$$

$$E \geq 150 \quad (II)$$

$$T \leq 19 \quad (III)$$

(where E represents a modulus of elasticity (cN/dtex) at 25° C. under a load of 49 N, and T represents a tensile strength (cN/dtex)).

5 Claims, 1 Drawing Sheet

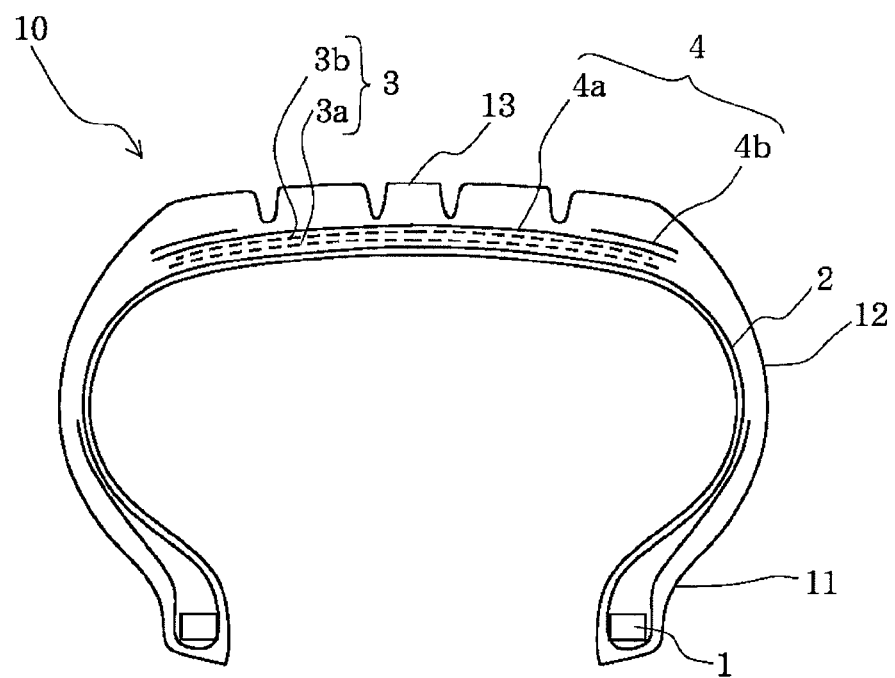

PNEUMATIC TIRE

TECHNICAL FIELD

The present invention relates to a pneumatic tire (hereinafter, sometimes simply referred to as a "tire"), in particular, a pneumatic tire having an improved cord material as a reinforcement.

BACKGROUND ART

In general, a pneumatic tire has a structure constituted of a frame, namely, a toroidal carcass layer extending from one of a pair of bead portions to the other, and surrounding belt layers or belt-reinforcement layers that reinforce the ground contact area and are obtained by rubberizing several kinds of reinforcements.

In particular, conventional carcass ply cords are mainly composed of polyethylene terephthalate (PET) as a polyester fiber or rayon as a cellulose fiber. Known means for decreasing the number of plies while maintaining the strength of the case include the use of para-aromatic polyamide (aramid) fiber to form the ply cords.

Usually, each of the belt layers has a laminated structure constituted of treated material (belt ply) layers each composed of a rubber coated fabric obtained by arranging reinforcing cords in parallel, and the reinforcing cords are made of aramid fiber so that the resulting belts have a reduced weight. However, belt layers reinforced by aramid cords have low rigidity. It is thus customary that at least one of the belt layers, the number of which is usually two or more, is constituted of a belt ply formed using aramid cords and that at least one of the remaining belt layers is constituted of a treated material formed using steel cords.

The belt layers of radial tires for passenger cars are mainly constituted of at least two angled steel belts and sometimes contain a cap layer or layering layers that are rubber coated fabrics formed using reinforcing cords such as nylon cords and arranged substantially in parallel with the circumference of the tire. These layers are intended to ensure driving stability, in particular, to improve durability through prevention of detachment of the belt layers (serious detachment seen especially near the edges of the belt layers) that occurs during high-speed driving. Known means for preventing deformation of the ground contact area during high-speed driving include the use of fiber that has high rigidity and maintains the elasticity thereof even when heated, such as aramid fiber, as a material of the cap layer or layering layers.

Examples of a technique for improving a tire belt include one disclosed in Patent Document 1: a pneumatic tire is realized that has a reduced weight, improved durability, and improved wear resistance, in which at least one of treated materials constituting a tire belt is a rubber coated fabric obtained by arranging aramid cords in parallel so that they are at an oblique angle with respect to the equator of the tire; at least one of the remaining treated materials is a rubber coated fabric obtained by arranging steel monofilaments in parallel so that they are at an oblique angle with respect to the equator of the tire and that they cross the aramid cords; and the interval of the steel monofilaments used in parallel in the treated materials is in the range of 0.10 to 0.50 mm.

Examples of a technique for improving a cap layer or layering layers include one disclosed in Patent Document 2: a pneumatic tire is realized that is well-balanced in terms of road noise, rolling resistance, and flat spot performance, in which the cap layer is divided along the width direction into a middle part and two end parts; the middle part is reinforced by stranded nylon cords having a predetermined twist and a predetermined fineness and settled with a lower embedding number so that the tensile modulus in the direction of the tire circumference per unit width is equal to or lower than 17 GPa/cm; and each of the end parts has an elongation modulus in the direction of the tire circumference of 35 GPa/cm or higher and a width in the range of 8 to 24 mm.

Patent Document 1: Japanese Unexamined Patent Application Publication No. H10-166812 (Claims and other sections)

Patent Document 2: Japanese Unexamined Patent Application Publication No. 2004-224074 (Claims and other sections)

DISCLOSURE OF INVENTION

Problems to be Solved by the Invention

However, treated materials used in the layers described above are all insufficient and have the following problems.

Regarding the carcass layer, the use of commonly available aramid fiber to decrease the number of plies while maintaining the strength of the case results in insufficient resistance to fatigue; however, the use of a twist structure or the like to improve resistance to fatigue spoils strength, thereby making the durability of the resulting tire questionable. More specifically, known carcass layers have a risk of breaking due to decrease in strength occurring at the bead-out portion during a bead durability test on a drum. This situation has led to demand for a technique for producing a carcass layer that has favorable durability in spite of a decreased number of plies for a reduced weight and spends less strain energy and other kinds of energy.

Regarding the belt layer, the use of aramid cords causes problematic decrease in strength to occur during driving on a drum: commonly available aramid fiber causes decrease in strength to occur at the bottom of pattern grooves and the ends of steel belts, and thus the durability of the tire falls below that of the steel cords. This situation has led to demand for a technique for producing a belt layer that has favorable durability in spite of a reduced weight, spends less strain energy and other kinds of energy, and offers favorable driving stability.

Regarding the belt-reinforcement layer contained in the cap/layer structure, the use of aramid fiber as reinforcing materials may cause tire shoulders to loosen during molding of them. During driving, this loosening tire shoulders causes compression input to occur, leading to decrease in strength, thereby resulting in breaking. Furthermore, commonly available aramid fiber has too high modulus of elasticity and thus gives only an insufficient ground contact area of tires during low-speed driving. A solution to this problem is increase in the twist number; admittedly, this solution decreases the modulus of elasticity, but decreases strength as well, thereby eventually decreasing the durability of the tire. This situation has led to demand for a technique for producing a pneumatic tire having a belt-reinforcement layer that has high strength, a low modulus of elasticity, and excellent resistance to fatigue.

Under these circumstances, the present invention is intended to solve the above problems and achieve the following objects: to provide a pneumatic tire having a carcass layer that has favorable durability in spite of a decreased number of plies for a reduced weight and spends less strain energy and other kinds of energy; to provide a pneumatic tire having a belt layer that has favorable durability despite being made of organic fiber and a reduced weight for decreasing rolling resistance, spends less strain energy and other kinds of energy, and offers favorable driving stability; and to provide a pneumatic tire containing a belt-reinforcement layer in the cap/layer structure described above that has high strength, a low modulus of elasticity, and excellent resistance to fatigue, in particular, excellent durability in high-speed driving.

Means for Solving the Problems

The present inventor conducted extensive research to solve these problems and found that these problems can be solved by using certain kinds of para-aromatic polyamide (aramid) fibers as reinforcing cords for the carcass layer, the belt layer, and the belt-reinforcement layers. Thus, the present inventor completed the present invention.

More specifically, the pneumatic tire according to the present invention is a pneumatic tire having a pair of left and right annular bead portions, a pair of left and right side walls connected to the bead portions, a tread provided between the side walls, a reinforcing carcass layer composed of at least one toroidal carcass ply extending between the bead portions, and a reinforcing belt layer composed of two or more belt plies arranged on the outer periphery of crown of the carcass layer, wherein the carcass ply is a rubber coated fabric obtained by arranging para-aramid cords in parallel, and the para-aramid cords satisfy the relationship represented by the following formulae (I) to (III):

$$E \leq 32.14 \times T - 236 \quad (I)$$

$$E \geq 150 \quad (II)$$

$$T \leq 19 \quad (III)$$

(where E represents a modulus of elasticity (cN/dtex) at 25° C. under a load of 49 N, and T represents a tensile strength (cN/dtex)).

Another pneumatic tire according to the present invention is a pneumatic tire having a pair of left and right annular bead portions, a pair of left and right side walls connected to the bead portions, a tread provided between the side walls, a reinforcing carcass layer composed of at least one toroidal carcass ply extending between the bead portions, and a reinforcing belt layer composed of two or more belt plies arranged on the outer periphery of crown of the carcass layer, wherein at least one of the belt plies is a rubber coated fabric obtained by arranging para-aramid cords in parallel so that the para-aramid cords are at an oblique angle with respect to the equator of the tire, the remaining belt ply is a rubber coated fabric obtained by arranging steel cords in parallel so that the steel cords are at an oblique angle with respect to the equator of the tire and that the steel cords cross the para-aramid cords, and the para-aramid cords satisfy the relationship represented by the following formulae (I) to (III):

$$E \leq 32.14 \times T - 236 \quad (I)$$

$$E \geq 150 \quad (II)$$

$$T \leq 19 \quad (III)$$

(where E represents a modulus of elasticity (cN/dtex) at 25° C. under a load of 49 N, and T represents a tensile strength (cN/dtex)).

Yet another pneumatic tire according to the present invention is a pneumatic tire having a pair of left and right annular bead portions, a pair of left and right side walls connected to the bead portions, a tread provided between the side walls, a reinforcing carcass layer composed of at least one toroidal carcass ply extending between the bead portions, and a reinforcing belt layer composed of two or more belt plies arranged on the outer periphery of crown of the carcass layer, as well as a belt-reinforcement layer consisting of rubber coated fabric obtained by arranging reinforcing cords substantially in parallel with the circumference of the tire, in which a cap layer is positioned on a tire radial outer side of the belt layer so as to cover the full width of the belt layer and/or layering layers are positioned at both ends of the belt layer, wherein the reinforcing cords constituting the belt-reinforcement layer are para-aramid cords, and the para-aramid cords satisfy the relationship represented by the following formulae (I) to (III):

$$E \leq 32.14 \times T - 236 \quad (I)$$

$$E \geq 150 \quad (II)$$

$$T \leq 19 \quad (III)$$

(where E represents a modulus of elasticity (cN/dtex) at 25° C. under a load of 49 N, and T represents a tensile strength (cN/dtex)).

In the present invention, the para-aramid cords preferably show a heat shrinkage ratio equal to or lower than 0.5% when dry-heated at 150° C. for 30 minutes, and their twist coefficient Nt, represented by the formula shown below, is preferably in the range of 0.45 to 0.99:

$$Nt = 0.001 \times N \times \sqrt{(0.125 \times D / \rho)}$$

(where N represents the twist number (twists/10 cm), ρ represents the specific gravity of the cords, and D represents the total decitex (dtex)).

ADVANTAGES

Configured as above, the present invention provides a pneumatic tire having a carcass layer that has favorable durability in spite of a decreased number of plies for a reduced weight and spends less strain energy and other kinds of energy, provides a pneumatic tire having a belt layer that has excellent durability despite being made of organic fiber and a reduced weight for decreasing rolling resistance, spends less strain energy and other kinds of energy, and offers favorable driving stability, and provides a pneumatic tire containing a belt-reinforcement layer in the cap/layer structure described above that has high strength, a low modulus of elasticity, and excellent resistance to fatigue, in particular, excellent durability in high-speed driving.

BRIEF DESCRIPTION OF DRAWINGS

FIG. 1 is an across-the-width cross-sectional diagram showing a pneumatic tire according to an embodiment of the present invention.

REFERENCE NUMERALS

1 Bead core
2 Carcass layer
3 (3a, 3b) Belt layer
4a Cap layer
4b Layering layer
4 Belt-reinforcement layer
10 Pneumatic tire
11 Bead portion
12 Side wall
13 Tread

BEST MODES FOR CARRYING OUT THE INVENTION

Hereinafter, preferred embodiments of the present invention are described in detail.

Embodiment 1

FIG. 1 shows a schematic cross-sectional diagram of an example of a pneumatic tire according to Embodiment 1 of the present invention. The illustrated tire 10 according to the present invention has a pair of left and right annular bead portions 11, a pair of left and right side walls 12 connected to the bead portions, and a tread 13 provided between the side walls and is reinforced by a carcass layer 2 composed of at least one (in the illustrated example, one) toroidal carcass ply extending between bead cores 1 individually embedded in the bead portions 11 and by an inexpansible belt layer 3 composed of two or more (in the illustrated example, two) belt plies 3a and 3b arranged on the outer periphery of crown of the carcass layer 2.

The tire 10 further has a belt-reinforcement layer 4 positioned on a tire radial outer side of the belt layer 3 so as to cover the full width of the belt layer 3 and is constituted of a cap layer 4a, which is a rubber coated fabric obtained by arranging reinforcing cords substantially in parallel with the circumference of the tire, and layering layers 4b positioned at both ends of the belt layer 3, which are rubber coated fabrics obtained by arranging reinforcing cords substantially in parallel with the circumference of the tire. Note that Embodiment 1 does not necessarily require the illustrated belt-reinforcement layer 4; the belt-reinforcement layer 4 is used as needed.

It is important in this embodiment that the carcass ply constituting the illustrated carcass layer 2 is a rubber coated fabric obtained by arranging para-aramid cords in parallel and that the para-aramid cords satisfy the relationship represented by the following formulae (I) to (III):

$$E \leq 32.14 \times T - 236 \quad \text{(I)}$$

$$E \geq 150 \quad \text{(II)}$$

$$T \leq 19 \quad \text{(III)}$$

(where E represents a modulus of elasticity (cN/dtex) at 25° C. under a load of 49 N, and T represents a tensile strength (cN/dtex)). With the use of para-aramid fiber satisfying this requirement to constitute the carcass ply, the ply offers improved strength availability and has excellent resistance to fatigue while maintaining high strength. Thus, the resultant tire has a reduced weight and is free from breaking even when used under severe conditions, for example, under heavy loads.

When the para-aramid cords contained in the carcass ply do not satisfy the formula (I) and/or the formula (III), the tire has insufficient resistance to fatigue and thus shows decreased strength potentially resulting in breaking during an endurance test. Also, when the para-aramid cords do not satisfy the formula (II), the ply has insufficient rigidity, and thus the tire has reduced performance in cornering. In the present invention, the modulus of elasticity E is preferably in the range of 184 to 296 cN/dtex, and the tensile strength T is preferably in the range of 14.4 to 17.6 cN/dtex.

In this embodiment, it is preferable that each para-aramid cord is constituted of two or three stranded filament bundles and that the total decitex is in the range of 3000 dtex to 7000 dtex, in particular, 3300 dtex to 5050 dtex. When the total decitex is smaller than 3000 dtex, rigidity in the circumferential direction and treating strength fall below the minimum requirement thereof, and the increase in durability falls below the expected level. However, when the total decitex is greater than 7000 dtex, the diameter of the cords is greater than the maximum requirement, and this causes an increase in the amount of rubber used to cover the tire, thereby resulting in an increased weight of the tire, reduced road-holding property, and reduced durability.

Additionally, when dry-heated at 150° C. for 30 minutes, the para-aramid cords preferably show a heat shrinkage ratio equal to or lower than 0.5%, in particular, in the range of 0.0% to 0.3%. When the heat shrinkage ratio is higher than 0.5%, the cords may non-uniformly shrink during vulcanization, resulting in reduced durability.

Also, the twist coefficient Nt of the para-aramid cords, represented by the formula shown below, is preferably in the range of 0.45 to 0.99:

$$Nt = 0.001 \times N \times \sqrt{(0.125 \times D/\rho)}$$

(where N represents the twist number (twists/10 cm), ρ represents the specific gravity of the cords, and D represents the total decitex (dtex)). Too small a twist coefficient would result in decreased resistance to compression fatigue and, accordingly, insufficient durability of the tire; however, too great a twist coefficient would result in reduced strength and, accordingly, reduced durability of the tire.

Embodiment 2

In Embodiment 2, it is important that at least one of the belt plies constituting the illustrated belt layer 3 is a rubber coated fabric obtained by arranging para-aramid cords in parallel so that the para-aramid cords are at an oblique angle with respect to the equator of the tire, that the remaining belt ply is a rubber coated fabric obtained by arranging steel cords in parallel so that the steel cords are at an oblique angle with respect to the equator of the tire and that the steel cords cross the para-aramid cords, and that the para-aramid cords satisfy the relationship represented by the following formulae (I) to (III):

$$E \leq 32.14 \times T - 236 \quad \text{(I)}$$

$$E \geq 150 \quad \text{(II)}$$

$$T \leq 19 \quad \text{(III)}$$

(where E represents a modulus of elasticity (cN/dtex) at 25° C. under a load of 49 N, and T represents a tensile strength (cN/dtex)). With the use of such para-aramid fiber to constitute the belt ply, the belt layer offers improved strength availability and has excellent resistance to fatigue while maintaining high strength. Thus, the resultant tire has a reduced weight and excellent durability.

When the para-aramid cords contained in the belt ply do not satisfy the formula (I) and/or the formula (III), the tire has insufficient resistance to fatigue and thus shows decreased strength potentially resulting in breaking during an endurance test. Also, when the para-aramid cords do not satisfy the formula (II), the belt has insufficient rigidity, and thus the tire has reduced performance in cornering. In the present invention, the modulus of elasticity E is preferably in the range of 184 to 296 cN/dtex, and the tensile strength T is preferably in the range of 14.4 to 17.6 cN/dtex.

In this embodiment, it is preferable that each para-aramid cord is constituted of two or three stranded filament bundles and that the total decitex is in the range of 3000 dtex to 7000 dtex, in particular, 3300 dtex to 5050 dtex. When the total decitex is smaller than 3000 dtex, rigidity in the circumferential direction and treating strength fall below the minimum requirement thereof, and the increase in durability falls below the expected level. However, when the total decitex is greater than 7000 dtex, the diameter of the cords is greater than the maximum requirement, and this causes an increase in the amount of rubber used to cover the tire, thereby resulting in an increased weight of the tire, reduced road-holding property, and reduced durability.

Additionally, when dry-heated at 150° C. for 30 minutes, the para-aramid cords preferably show a heat shrinkage ratio equal to or lower than 0.5%, in particular, in the range of 0.0% to 0.3%. When the heat shrinkage ratio is higher than 0.5%, the cords may non-uniformly shrink during vulcanization, resulting in reduced durability.

Also, the twist coefficient Nt of the para-aramid cords, represented by the formula shown below, is preferably in the range of 0.45 to 0.99:

$$Nt=0.001 \times N \times \sqrt{(0.125 \times D/\rho)}$$

(where N represents the twist number (twists/10 cm), ρ represents the specific gravity of the cords, and D represents the total decitex (dtex)). Too small a twist coefficient would result in decreased resistance to compression fatigue and, accordingly, insufficient durability of the tire; however, too great a twist coefficient would result in reduced strength and, accordingly, reduced durability of the tire.

Note that this embodiment also does not necessarily require the illustrated belt-reinforcement layer 4; the belt-reinforcement layer 4 is used as needed.

Embodiment 3

In Embodiment 3, the belt-reinforcement layer 4 constituted of the cap layer 4a and layering layers 4b described above is necessary. It is important in this embodiment that the reinforcing cords constituting the belt-reinforcement layer 4 are para-aramid cords and that the para-aramid cords satisfy the relationship represented by the following formulae (I) to (III):

$$E \leq 32.14 \times T - 236 \quad (I)$$

$$E \geq 150 \quad (II)$$

$$T \leq 19 \quad (III)$$

(where E represents a modulus of elasticity (cN/dtex) at 25° C. under a load of 49 N, and T represents a tensile strength (cN/dtex)). With the use of such para-aramid fiber as reinforcing cords for the cap layer and/or layering layers constituting the belt-reinforcement layer, the belt-reinforcement layer offers improved strength availability and has a reduced modulus of elasticity and excellent resistance to fatigue while maintaining high strength. Thus, the resultant tire ensures a sufficient ground contact area even during low-speed driving and is free from breaking even when used under severe conditions, for example, under heavy loads.

When the para-aramid cords contained in the belt ply do not satisfy the formula (I) and/or the formula (III), the tire has insufficient resistance to fatigue and thus shows decreased strength potentially resulting in breaking during an endurance test. Also, when the para-aramid cords do not satisfy the formula (II), the cap has insufficient rigidity, and thus the tire has reduced performance in cornering. In the present invention, the modulus of elasticity E is preferably in the range of 184 to 296 cN/dtex, and the tensile strength T is preferably in the range of 14.4 to 17.6 cN/dtex.

In this embodiment, the embedding number of reinforcing cords constituting the belt-reinforcement layer 4 is preferably in the range of 40 number/50 mm to 70 number/50 mm. When the embedding number is smaller than 40 number/50 mm, the tire has insufficient rigidity and, accordingly, reduced performance; however, when the embedding number is greater than 70 number/50 mm, the distance between the cords is small, and thus the tire is inferior in durability.

Also, it is preferable in this embodiment that the cap layer and the layering layers are each prepared by repeatedly winding a ribbon-like sheet in a spiral pattern, with the ribbon-like sheet constituted of one or more rubberized reinforcing cords and having a width smaller than the width reached after being wound.

In this embodiment, it is preferable that each para-aramid cord is constituted of two stranded filament bundles and that the total decitex is in the range of 3000 dtex to 7000 dtex, in particular, 3300 dtex to 5050 dtex. When the total decitex is smaller than 3000 dtex, rigidity in the circumferential direction and treating strength fall below the minimum requirement thereof, and the increase in durability falls below the expected level. However, when the total decitex is greater than 7000 dtex, the diameter of the cords is greater than the maximum requirement, and this causes an increase in the amount of rubber used to cover the tire, thereby resulting in an increased weight of the tire, reduced road-holding property, and reduced durability.

Additionally, when dry-heated at 150° C. for 30 minutes, the para-aramid cords preferably show a heat shrinkage ratio equal to or lower than 0.5%, in particular, in the range of 0.0% to 0.3%. When the heat shrinkage ratio is higher than 0.5%, the cords may non-uniformly shrink during vulcanization, resulting in reduced durability.

Also, the twist coefficient Nt of the para-aramid cords, represented by the formula shown below, is preferably in the range of 0.45 to 0.99:

$$Nt=0.001 \times N \times \sqrt{(0.125 \times D/\rho)}$$

(where N represents the twist number (twists/10 cm), ρ represents the specific gravity of the cords, and D represents the total decitex (dtex)). Too small a twist coefficient would result in decreased resistance to compression fatigue and, accordingly, insufficient durability of the tire; however, too great a ply factor would result in reduced strength and, accordingly, reduced durability of the tire.

Specific examples of para-aramid fiber applicable to the present invention include copolyparaphenylene-3,4'-oxydiphenylene terephthalamide and polyparaphenylene terephthalamide or the like, and particularly copolyparaphenylene-3,4'-oxydiphenylene terephthalamide can preferably be used. These materials are all easily available in market as Technora (trademark) manufactured by Teijin Ltd., Kevlar (trademark) manufactured by DuPont, or the like.

The use of para-aramid cords satisfying the conditions described above as reinforcing cords constituting the carcass layer, belt layer, or belt-reinforcement layer is the only important requirement for the manufacture of a tire according to the present invention; therefore, no particular limitation is imposed on the other configurations, such as details of the specific structure of the cords and the tire. For example, although not shown in the drawing, the innermost layer of the tire 10 usually has an inner liner, and the surface of the tread is patterned as needed. In addition, the gas filling the pneumatic tire according to the present invention may be normal air, air with different oxygen partial pressures, or an inert gas, such as nitrogen.

EXAMPLES

Hereinafter, the present invention is described in more detail with reference to examples thereof.

Example 1

Sample tires having a size of 245/50R18 were prepared with the carcass ply thereof constituted of the reinforcing cords (aramid cords) listed in Tables 1 and 2 below. Note that aramid used in the examples was less rigid than one used in the comparative examples.

<Measurement of Initial Strength of Cords>

In accordance with JIS L 1017, the individual reinforcing cords were evaluated for strength by Autograph at room temperature (25±2° C.).

<Driving Test on a Drum>

Each sample tire was pressurized at room temperature, namely, 25° C.±2° C., until the internal pressure reached 294 kPa (3.0 kg/cm²), allowed to stand for 24 hours, and then adjusted in terms of pneumatic pressure once again. Under a load as twice heavy as the load specified in JIS, the tire was allowed to wheel at 60 km/h on a drum having a diameter of approximately 3 m until the travel distance reached 20,000 km. The distance at breaking was measured as the distance limit, and the obtained distance limits were converted into indices with the distance limit of Comparative Example 1-1 being 100. The greater the index is, the longer the distance limit is and the better the test result is.

After this driving test, each cord was removed from the corresponding tire and then evaluated for strength in accordance with JIS L 1017 as described above. The measured strength was converted into the retention ratio in % with the strength measured before the driving test being 100%. The greater the value is, the higher the retention ratio is and the better the test result is.

The obtained results and the modulus of elasticity E, tensile strength T, and other measurements of the individual reinforcing cords are shown in Table 1 and 2 below.

TABLE 1

|  | Comparative Example 1-1 | Comparative Example 1-2 | Example 1-1 | Example 1-2 | Example 1-3 |
|---|---|---|---|---|---|
| Carcass material | Aramid A | Aramid B | Aramid 1 | Aramid 2 | Aramid 3 |
| Cord structure (dtex) | 1670/2 | 1670/2 | 1670/2 | 1100/3 | 1670/2 |
| Embedding number (number/50 mm) | 50 | 50 | 50 | 50 | 50 |
| Modulus of elasticity E (cN/dtex) at 25° C. under a load of 49 N | 299 | 235.9 | 200 | 231 | 184 |
| Tensile strength T (cN/dtex) | 13.7 | 12.5 | 15.1 | 17.4 | 14.4 |
| Right side of the formula (I) | 204 | 166 | 249 | 323 | 227 |
| Heat shrinkage ratio (%) after dry-heating at 150° C. for 30 minutes | 0.1 | 0.1 | 0.1 | 0.1 | 0.1 |
| Twist coefficient Nt | 0.64 | 0.75 | 0.64 | 0.60 | 0.75 |
| Tire structure | 1PH | 1PH | 1PH | 1PH | 1PH |
| Distance limit for driving on a drum (index) | 100 | 95 | 110 | 115 | 105 |
| Cord strength retention ratio (%) after driving on a drum | 55 | 64 | 89 | 85 | 98 |

TABLE 2

|  | Example 1-4 | Example 1-5 | Example 1-6 | Example 1-7 |
|---|---|---|---|---|
| Carcass material | Aramid 4 | Aramid 5 | Aramid 1 | Aramid 5 |
| Cord structure (dtex) | 1100/3 | 1670/2 | 1670/2 | 1670/2 |
| Embedding number (number/50 mm) | 50 | 50 | 50 | 50 |
| Modulus of elasticity E (cN/dtex) at 25° C. under a load of 49 N | 296 | 248 | 200 | 248 |
| Tensile strength T (cN/dtex) | 17.6 | 15.9 | 15.1 | 15.9 |
| Right side of the formula (I) | 330 | 275 | 249 | 275 |
| Heat shrinkage ratio (%) after dry-heating at 150° C. for 30 minutes | 0.1 | 0.1 | 0.1 | 0.1 |
| Twist coefficient Nt | 0.54 | 0.54 | 0.65 | 0.54 |
| Tire structure | 1PH | 1PH | 1P-Envelope | 1P-Envelope |
| Distance limit for driving on a drum (index) | 120 | 115 | 105 | 108 |
| Cord strength retention ratio (%) after driving on a drum | 84 | 85 | 78 | 77 |

As shown in Tables 1 and 2 above, the sample tires according to the examples, whose carcass layer was constituted of para-aramid cords satisfying the formulae (I) to (III) described earlier, had high cord strength and excellent durability.

Example 2

Sample tires having a size of 305/30ZR19 were prepared with the belt ply thereof constituted of the reinforcing cords listed in Tables 3 and 4 below.

<Measurement of Initial Strength of Cords>

In accordance with JIS L 1017, the individual reinforcing cords were evaluated for strength by Autograph at room temperature (25±2° C.).

<Driving Test on a Drum>

Each sample tire was pressurized at room temperature, namely, 25° C.±2° C., until the internal pressure reached 294 kPa (3.0 kg/cm$^2$), allowed to stand for 24 hours, and then adjusted in terms of pneumatic pressure once again. Under a load as twice heavy as the load specified in JIS, the tire was allowed to wheel at 60 km/h on a drum having a diameter of approximately 3 m until the travel distance reached 20,000 km. The distance at breaking was measured as the distance limit, and the obtained distance limits were converted into indices with the distance limit of Comparative Example 2-1 being 100. The greater the index is, the longer the distance limit is and the better the test result is.

<Measurement of Residual Strength of Cords>

After the driving test, each cord was removed from the corresponding tire and then evaluated for strength in accordance with JIS L 1017 as described above. The measured strength was converted into the retention ratio in % with the strength measured before the driving test being 100%. The greater the value is, the higher the retention ratio is and the better the test result is.

The obtained results and the modulus of elasticity E, tensile strength T, and other measurements of the individual reinforcing cords are shown in Tables 3 and 4 below.

TABLE 3

|  | Comparative Example 2-1 | Comparative Example 2-2 | Example 2-1 | Example 2-2 | Example 2-3 |
| --- | --- | --- | --- | --- | --- |
| Belt material | Aramid A | Aramid B | Aramid 1 | Aramid 2 | Aramid 3 |
| Cord structure (dtex) | 1670/2 | 1670/2 | 1670/2 | 1100/3 | 1670/2 |
| Embedding number (number/50 mm) | 50 | 50 | 50 | 50 | 50 |
| Modulus of elasticity E (cN/dtex) at 25° C. under a load of 49 N | 299 | 235.9 | 200 | 231 | 184 |
| Tensile strength T (cN/dtex) | 13.7 | 12.5 | 15.1 | 17.4 | 14.4 |
| Right side of the formula (I) | 204 | 166 | 249 | 323 | 227 |
| Heat shrinkage ratio (%) after dry-heating at 150° C. for 30 minutes | 0.1 | 0.1 | 0.1 | 0.1 | 0.1 |
| Twist coefficient Nt | 0.64 | 0.75 | 0.64 | 0.60 | 0.75 |
| Belt structure*[1] | 1B: Steel 2B: Aramid | 1B: Steel 2B: Aramid | 1B: Steel 2B: Aramid | 1B: Steel 2B: Aramid | 1B: Steel 2B: Aramid |
| Distance limit for driving on a drum (index) | 100 | 95 | 110 | 115 | 105 |
| Cord strength retention ratio (%) after driving on a drum | 55 | 64 | 89 | 85 | 98 |

*[1]Along the radial direction of a tire, the inner belt is 1B, and the outer belt is 2B.

TABLE 4

|  | Example 2-4 | Example 2-5 | Example 2-6 | Example 2-7 |
| --- | --- | --- | --- | --- |
| Belt material | Aramid 4 | Aramid 5 | Aramid 1 | Aramid 5 |
| Cord structure (dtex) | 1100/3 | 1670/2 | 1670/2 | 1670/2 |
| Embedding number (number/50 mm) | 50 | 50 | 50 | 50 |
| Modulus of elasticity E (cN/dtex) at 25° C. under a load of 49 N | 296 | 248 | 200 | 248 |
| Tensile strength T (cN/dtex) | 17.6 | 15.9 | 15.1 | 15.9 |
| Right side of the formula (I) | 330 | 275 | 249 | 275 |
| Heat shrinkage ratio (%) after dry-heating at 150° C. for 30 minutes | 0.1 | 0.1 | 0.1 | 0.1 |
| Twist coefficient Nt | 0.54 | 0.54 | 0.65 | 0.54 |
| Belt structure*[1] | 1B: Steel 2B: Aramid | 1B: Steel 2B: Aramid | 1B: Aramid 2B: Aramid | 1B: Aramid 2B: Aramid |
| Distance limit for driving on a drum (index) | 120 | 115 | 105 | 108 |
| Cord strength retention ratio (%) after driving on a drum | 84 | 85 | 78 | 77 |

As shown in Tables 3 and 4 above, the sample tires according to the examples, whose belt layer was constituted of para-aramid cords satisfying the formulae (I) to (III) described earlier, had high cord strength and excellent durability.

Example 3

Sample tires having a size of 235/55R17 were prepared. In each sample tire, the belt-reinforcement layer, which was constituted of a cap layer and layering layers, was composed of the reinforcing cords listed in Table 5 below.

<Measurement of Initial Strength of Cords>
In accordance with JIS L 1017, the individual reinforcing cords were evaluated for strength by Autograph at room temperature (25±2° C.).

<Driving Test on a Drum>
Each sample tire was pressurized at room temperature, namely, 25° C.±2° C., until the internal pressure reached 294 kPa (3.0 kg/cm²), allowed to stand for 24 hours, and then adjusted in terms of pneumatic pressure once again. Under a load as twice heavy as the load specified in JIS, the tire was allowed to wheel at 60 km/h on a drum having a diameter of approximately 3 m until the travel distance reached 20,000 km. The distance at breaking was measured as the distance limit, and the obtained distance limits were converted into indices with the distance limit of Comparative Example 3-1 being 100. The greater the index is, the longer the distance limit is and the better the test result is.

<Measurement of Residual Strength of Cords>
After the driving test, each cord was removed from the corresponding tire and then evaluated for strength in accordance with JIS L 1017 as described above. The measured strength was converted into the retention ratio in % with the strength measured before the driving test being 100%. The greater the value is, the higher the retention ratio is and the better the test result is.

<Measurement of Ground Contact Area>
Each sample tire was pressurized at normal temperature (25° C.) until the internal pressure reached 230 kPa. Under a load equal to the load specified in JIS, the ground contact area of the tire was measured. The measurements were converted into indices with the index for Comparative Example 3-1 being 100.

<Evaluation of Steering Stability>
Steering stability was measured at driving speeds of 40 km/h and 180 km/h, and the measurements were converted into indices with the index for the Comparative Example 3 being 100. The greater the index is, the better the test result is.

The obtained results and the modulus of elasticity E, tensile strength T, and other measurements of the individual reinforcing cords are shown in Table 5 below.

TABLE 5

|  | Comparative Example 3 | Example 3-1 | Example 3-2 | Example 3-3 | Example 3-4 |
| --- | --- | --- | --- | --- | --- |
| Cap/Layer material | Aramid A | Aramid 1 | Aramid 2 | Aramid 3 | Aramid 4 |
| Cord structure (dtex) | 1670/2 | 1670/2 | 1100/3 | 1670/2 | 1100/3 |
| Embedding number (number/50 mm) | 50 | 50 | 50 | 50 | 50 |
| Modulus of elasticity E (cN/dtex) at 25° C. under a load of 49 N | 299 | 200 | 231 | 184 | 296 |
| Tensile strength T (cN/dtex) | 13.7 | 15.1 | 17.4 | 14.4 | 17.6 |
| Right side of the formula (I) | 204 | 249 | 323 | 227 | 330 |
| Heat shrinkage ratio (%) after dry-heating at 150° C. for 30 minutes | 0.1 | 0.1 | 0.1 | 0.1 | 0.1 |
| Twist coefficient Nt | 0.64 | 0.64 | 0.60 | 0.75 | 0.54 |
| Belt-reinforcement layer structure | 1 cap 1 layer | 1 cap 1 layer | 1 cap 1 layer | 1 cap 1 layer | 1 cap 1 layer |
| Distance limit for driving on a drum (index) | 100 | 110 | 115 | 105 | 120 |
| Cord strength retention ratio (%) after driving on a drum | 55 | 89 | 85 | 98 | 84 |
| Ground contact area (normal temperature) (index) | 100 | 111 | 106 | 113 | 104 |
| Steering stability at 40 km/h (index) | 100 | 105 | 103 | 106 | 102 |
| Steering stability at 180 km/h (index) | 100 | 101 | 99 | 101 | 102 |

As shown in Table 5 above, the sample tires according to the examples, whose belt-reinforcement layer was constituted of para-aramid cords satisfying the formulae (I) to (III) described earlier, had high cord strength and excellent durability, ensured a sufficient ground contact area with a reduced modulus of elasticity, and offered favorable steering stability in both low-speed driving and high-speed driving.

The invention claimed is:
1. A pneumatic tire comprising a pair of left and right annular bead portions, a pair of left and right side walls connected to the bead portions, a tread provided between the side walls, a reinforcing carcass layer composed of at least one toroidal carcass ply extending between the bead portions, and a reinforcing belt layer composed of two or more belt plies arranged on the outer periphery of crown of the carcass layer, wherein
at least one of the belt plies is a rubber coated fabric obtained by arranging para-aramid cords in parallel so that the para-aramid cords are at an oblique angle with respect to the equator of the tire, the remaining belt ply is a rubber coated fabric obtained by arranging steel cords in parallel so that the steel cords are at an oblique angle with respect to the equator of the tire and that the steel cords cross the para-aramid cords, and the para-aramid cords satisfy the relationship represented by the following formulae (I) to (III):

$$E \leq 32.14 \times T - 236 \quad (I)$$

$$E \geq 150 \quad (II)$$

$$T \leq 19 \quad (III)$$

(where E represents a modulus of elasticity (cN/dtex) at 25° C. under a load of 49 N, and T represents a tensile strength (cN/dtex)).

2. The pneumatic tire according to claim 1, wherein each of the para-aramid cords is constituted of two stranded filament bundles and the total decitex is in the range of 3000 dtex to 7000 dtex.

3. The pneumatic tire according to claim 1, wherein each of the para-aramid cords is constituted of three stranded filament bundles and the total decitex is in the range of 3000 dtex to 7000 dtex.

4. The pneumatic tire according to claim 1, wherein the para-aramid cords show a heat shrinkage ratio equal to or lower than 0.5% when dry-heated at 150° C. for 30 minutes.

5. The pneumatic tire according to claim 1, the modulus of elasticity is in a range of 184 to 296 cN/dtex, and the tensile strength is in a range of 14.4 to 17.6 cN/dtex.

\* \* \* \* \*